(12) United States Patent
Filleul

(10) Patent No.: US 7,201,861 B2
(45) Date of Patent: Apr. 10, 2007

(54) METHOD FOR INJECTING RESIN IN A MOULD CONTAINING A FIBROUS PREFORM

(75) Inventor: Didier Filleul, Bievres (FR)

(73) Assignee: EADS CCR, Paris (FR)

( * ) Notice: Subject to any disclaimer, the term of this patent is extended or adjusted under 35 U.S.C. 154(b) by 347 days.

(21) Appl. No.: 10/466,576

(22) PCT Filed: Jan. 22, 2002

(86) PCT No.: PCT/FR02/00250

§ 371 (c)(1),
(2), (4) Date: Nov. 17, 2003

(87) PCT Pub. No.: WO02/058919

PCT Pub. Date: Aug. 1, 2002

(65) Prior Publication Data

US 2004/0070114 A1    Apr. 15, 2004

(30) Foreign Application Priority Data

Jan. 24, 2001   (FR) .................................. 01 00926

(51) Int. Cl.
*B29C 45/76*       (2006.01)
*B29C 70/48*       (2006.01)
(52) U.S. Cl. ...................... 264/102; 264/255; 264/257; 264/258; 264/324; 264/328.1; 264/328.14; 425/144; 425/145

(58) Field of Classification Search ........ 264/257–258, 264/102, 328.1, 328.14, 324; 425/144, 145
See application file for complete search history.

(56) References Cited

U.S. PATENT DOCUMENTS

| 4,247,018 A |   | 1/1981 | Credle |
| 4,467,941 A |   | 8/1984 | Du |
| 5,187,001 A |   | 2/1993 | Brew |
| 5,516,271 A |   | 5/1996 | Swenor et al. |
| 5,545,029 A |   | 8/1996 | Hauser |
| 5,775,402 A | * | 7/1998 | Sachs et al. ................. 164/4.1 |
| 5,906,782 A |   | 5/1999 | Blanchard et al. |
| 6,136,236 A | * | 10/2000 | Boccard et al. ............ 264/40.1 |
| 6,168,408 B1 |  | 1/2001 | Boime et al. |
| 6,576,179 B1 | * | 6/2003 | Abe et al. .............. 264/328.18 |

FOREIGN PATENT DOCUMENTS

| FR | 2 750 071 | 6/1996 |
| FR | 2 761 001 | 3/1997 |

OTHER PUBLICATIONS

Preliminary Search Report for FR 0100926, dated Oct. 16, 2001.

* cited by examiner

*Primary Examiner*—Stefan Staicovici
(74) *Attorney, Agent, or Firm*—Thelen Reid Brown Raysman & Steiner LLP

(57) ABSTRACT

To produce a large-size item using the RTM technique, only two reservoirs (16a, 16b) are used which are alternately connected to the mould (10). When one of the reservoirs is empty, it is replaced by another reservoir full of resin while the resin contained in the other reservoir is injected into mould (10).

6 Claims, 1 Drawing Sheet

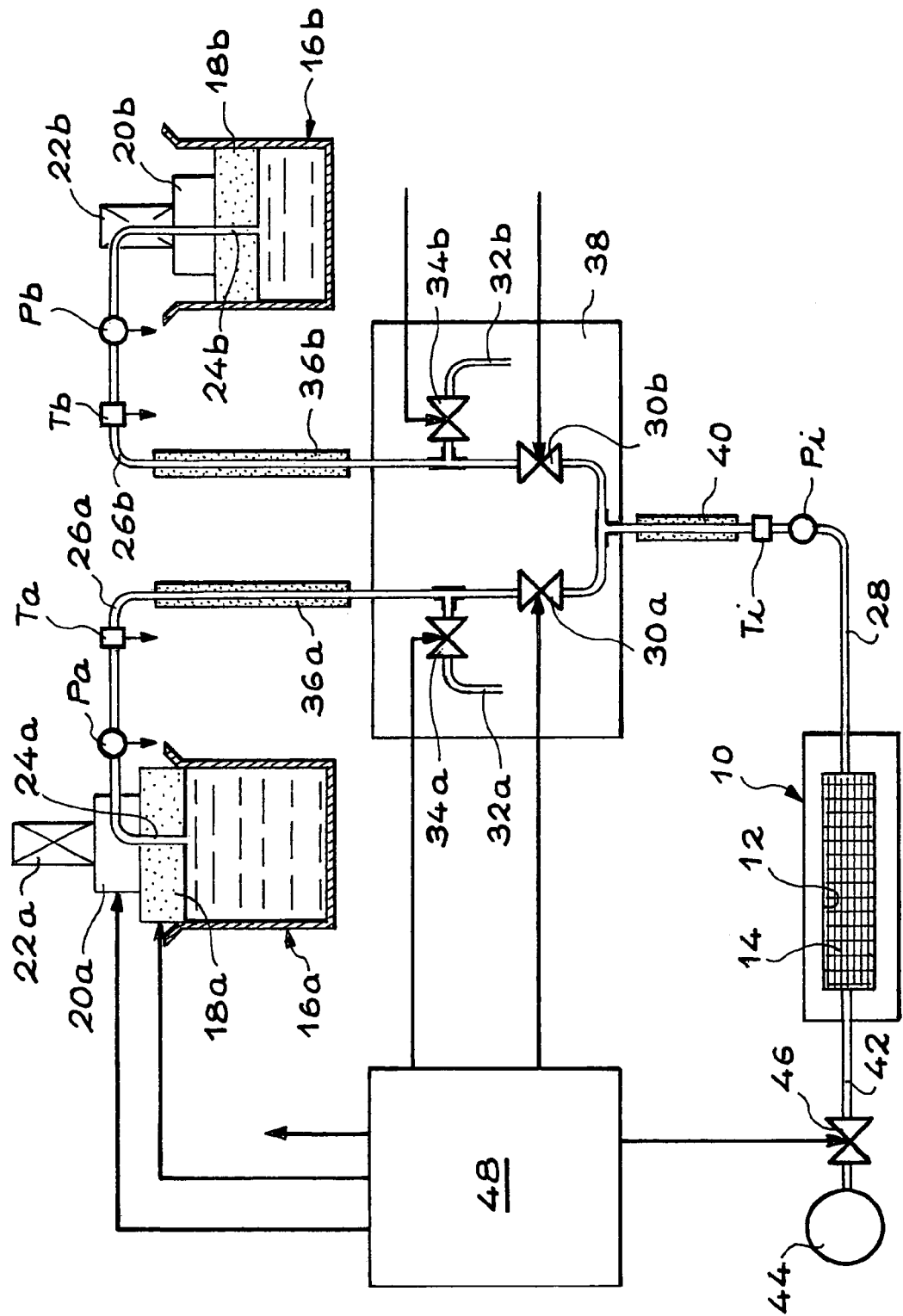

1

METHOD FOR INJECTING RESIN IN A MOULD CONTAINING A FIBROUS PREFORM

CROSS-REFERENCE TO RELATED APPLICATION

This application claims priority based on International Patent Application No. PCT/FR02/00250, entitled "Method for Injecting Resin in a Mould Containing a Fibrous Preform" by Didier Filleul which claims priority of French application no. 01 00926, filed Jan. 24, 2001, and which was not published in English.

TECHNICAL FIELD

The present invention concerns a method for injecting resin into a mould containing a fibrous preform, so as to produce an item in composite material using the resin transfer moulding technique, usually called "RTM technique".

The technique of the invention is particularly adapted to the manufacture of large-size items in composite material.

The invention may be used in all industrial sectors using items in composite material formed of long fibres embedded in a resin matrix. Among such sectors, the automobile and aerospace sectors may be cited in particular.

PRIOR ART

As described in particular in document FR-A-2 761 001, it has already been considered to manufacture large-size items in composite material using the RTM technique. For this purpose, the usual solution consists of placing in one same sealed tank a number of reservoirs (called "pots") filled with sufficient resin to manufacture the item under consideration. Therefore, and solely as an example, if the maximum volume of resin contained in a pot is approximately 10 kilograms, the manufacture of an item containing approximately 60 liters of resin requires placing at least six pots of resin in the sealed tank.

In an installation such as the one described in document FR-A-2 761 001, heating means such as electric resistances are placed in the sealed tank, at the bottom of the tank and around each of the pots, so as to liquefy the resin in the pots to enable its mould injection.

When this known installation is placed in operation, the resin contained in the pots is injected into the mould under the effect of the pressure prevailing in the sealed tank. More precisely, signals emitted by a flowmeter or by weighing means associated with the different pots, which indicate the filling status of each of the pots, are transmitted to a central unit. In response to these signals, the central command unit controls the successive opening of electrovalves associated with each of the pots of resin and which are usually closed. Consequently, the content of each of the pots is successively emptied into the mould to produce the desired item.

The installation described in document FR-A-2 761 001 has various disadvantages. These mainly concern its use at industrial level.

Therefore in order to manufacture items of very large size, a high number of pots have to be placed in one same sealed tank. This leads to the use of a heavy, cumbersome installation whose size relates to the dimensions of the item it is wished to produce.

Another disadvantage of the installation described in document FR-A-2 761 001 concerns the risk of exothermal reaction subsequent to mass heating of the resin contained in the different pots placed in the sealed tank. The possibility of this type of reaction is hardly acceptable in an industrial installation.

Also, document FR-A-2 750 071 proposes an installation using the RTM technique in which the resin contained in a pot is transferred to a jack by means of a piston placed above the resin actuated by compressed air. In this document, the technique used to bring the resin to the liquid state is not specified.

Document U.S. Pat. No. 5,545,029 teaches the mixing of two liquid components contained in separate reservoirs before injecting them into a mould.

Finally, document U.S. Pat. No. 5,187,001 describes an installation for producing small-size items using the RTM technique. The installation comprises two reservoirs containing resins of different types, which are used in turn depending upon the item to be manufactured. When switching from one reservoir to another the circuit of the reservoir previously used is drained.

DESCRIPTION OF THE INVENTION

The subject of the invention is a method for injecting resin into a large-size mould containing a fibrous preform, using an installation whose size and weight are unrelated to the size of the item to be produced and are comparable with those of an installation able to produce small-size items.

In accordance with the invention, this result is obtained by means of a method for injecting resin into a mould containing a fibrous preform, characterized in that the resin is injected into the mould alternately from a first reservoir and from a second reservoir, which are emptied in turn, the first reservoir being filled with resin while injecting resin from the second reservoir and conversely, for the continuous injection into the mould of a quantity of resin greater than the accumulated size content of said first reservoir and second reservoir.

With this method, using only two reservoirs of standard size (each containing approximately 10 kilograms of resin for example), it is possible to produce items whose size is practically only limited by resin viscosity changes. One same installation, of relatively small size, can therefore be used to produce different items which may very large-size.

In one preferred embodiment of the invention the resin is injected alternately from the first reservoir and the second reservoir by heating the free surface of the resin contained in said reservoirs, to cause local melting of said resin, and by pumping locally melted resin towards the mould. By limiting resin heating to its free surface, inside each of the reservoirs, it is possible to eliminate any risk of exothermal reaction. This largely facilitates the industrial use of the installation.

In the preferred embodiment of the invention, the free surface of the resin in each of the first and second reservoirs is heated by means of a heating tray resting under gravity on said free surface.

In this case, the locally melted resin in each of the first and second reservoirs is advantageously pumped using a pump that is integral with the heating tray.

Preferably, before injecting the resin into the mould, the circuits connecting the first reservoir and second reservoir to the mould are drained.

The method of the invention is particularly adapted for use with degassed resin.

However, as a variant, the resin can be degassed between the first and second reservoirs and the mould.

SHORT DESCRIPTION OF THE DRAWINGS

A preferred embodiment of the method of the invention is described below as a non-restrictive example with reference to the appended drawings, in which the single FIGURE schematically shows an installation using the method of injection of the invention.

DETAILED DESCRIPTION OF A PREFERRED EMBODIMENT OF THE INVENTION

In the single FIGURE, which is not limitative however, a preferred embodiment is schematically shown of an installation using the resin injection method of the invention.

In the FIGURE, the installation comprises a mould 10, in several parts, delimiting a cavity 12 on the inner side, whose size and shape are the same as those of the item to be produced. Before closing mould 10, a fibrous preform 14 is placed in cavity 12.

The installation also comprises a first reservoir 16a and a second reservoir 16b each able to contain a determined quantity of a resin chosen in relation to the characteristics of the item to be manufactured. The capacity of each of reservoirs 16a and 16b is generally the same. This capacity may for example be approximately 10 kilograms. However, this value is given for guidance purposes only and in no way restricts the scope of the invention.

The reservoirs may in particular be commercially available resin pots having a capacity of 10 kilograms. When the first reservoir is empty, the operator can replace it by a full reservoir.

Each of reservoirs 16a and 16b is open at the top so that the resin it contains has a substantially horizontal free surface. At room temperature the resin is in paste or solid state.

A heating tray 18a,18b rests under gravity on the free surface of the resin contained in the first reservoir 16a and second reservoir 16b respectively. More precisely, the horizontal section of each of heating trays 18a and 18b is substantially identical to that of reservoirs 16a and 16b so that the reservoirs are closed at the top by the trays, but these trays can move downwards in the reservoirs as and when the quantity of resin they contain is reduced.

The heating means contained in trays 18a and 18b may be of any type while remaining within the scope of the invention. They may in particular be electric resistances (not shown). When placed in operation, these heating means are able to melt the resin superficially only in the immediate vicinity of its free surface.

As will be better understood below, this arrangement makes it possible for the resin contained in either of reservoirs 16a, 16b to be pumped gradually, while eliminating any risk of exothermal reaction caused by mass fusion of the resin.

Each of heating trays 18a and 18b carries a pump respectively denoted 20a and 20b. Motors 22a and 22b of pumps 20a and 20b are also shown in the single figure.

Each of pumps 20a and 20b is arranged so that it can pump out the melted resin in contact with the lower surface of corresponding heating tray 18a, 18b through one or more passageways 24a, 24b passing through this tray and leading to its lower surface.

A delivery opening of each of pumps 20a and 20b is connected to a corresponding pipe 26a, 26b. At their opposite end each of pipes 26a and 26b is connected to a common pipe 28 whose opposite end is itself connected to mould 10. The assembly made up of passageways 24a, 24b and pipes 26a, 26b and 28 forms a resin supply circuit to mould 10, alternately from first reservoir 16a and from second reservoir 16b.

Close to their point of connection to common pipe 28, each of pipes 26a and 26b comprises an injection electrovalve 30a, 30b. When the installation is not in operation, the two electrovalves 30a and 30b are normally closed. Also, when the installation is in operation, the two electrovalves 30a and 30b are never simultaneously open.

Immediately upstream from injection electrovalves 30a and 30b, a drain pipe 32a, 32b fitted with a drain electrovalve 34a, 34b is shunt connected on each of pipes 26a and 26b. Drain electrovalves 34a and 34b are normally closed.

The resin supply circuit for mould 10 comprises a certain number of heated zones which maintain the resin injected into the mould at an appropriate temperature to allow complete filling of the mould and complete impregnation of fibrous preform 14. Therefore, as an example, pipes 26a and 26b comprise heated zones 36a,36b at their portions located between pumps 20a and 20b and drain pipes 32a, 32b. That part of pipes 26a and 26b connected to pipe 28, integrating electrovalves 30a, 30b, 34a and 34b, is also placed in a heated zone 38. Finally, another heated zone 40 is also provided on pipe 28.

To better control the conditions under which resin is injected into the mould, a certain number of sensors are placed in the injection circuit. As an example the single FIGURE shows three pressure sensors Pa, Pb and Pi respectively positioned at the outlet of pumps 20a and 20b and at the inlet of mould 10, and three temperature sensors Ta, Tb and Ti are positioned in the vicinity of pressure sensors Pa, Pb and Pi. Pressure and temperature sensors (not shown) are also provided preferably on mould 10.

The installation also comprises a pressure-lowering pipe 32 for mould 10 used prior to resin injection. Pipe 42 connects mould 10 to a vacuum pump 44. It is connected to mould 10 opposite pipe 28 and incorporates an electrovalve 46.

Finally, the resin injection installation shown in the single FIGURE comprises a central command unit 48. This unit 48 pilots the active parts of the installation, such as pumps 20a, 20b, vacuum pump 44, electrovalves 30a, 30b, 34a, 34b and 46, and heating means integrated in trays 18a and 18b and in zones 36a, 36b, 38 and 40 in accordance with a preset programme and in relation to the signals delivered by pressure sensors Pa, Pb and Pi and temperature sensors Ta, Tb and Ti. The central command unit 48 generally comprises a computer and programmable automated unit. In particular it controls injection of resin into the mould according to a cycle described below.

Prior to injection properly so called, reservoirs 16a, 16b are placed in position, filled with the same resin appropriate for producing the desired item. More precisely the resin placed in the reservoirs is generally degassed resin. If not, one or more degassing devices are placed in the injection circuit.

When reservoirs 16a, 16b filled with resin are in position, heating trays 18a, 18b carrying pumps 20a, 20b are placed on the free surface of the resin in each of the reservoirs so that they seal the latter.

At the same time, mould 10 containing fibrous preform 14 is closed and connected to the injection circuit and vacuum pipe 42. At this stage, electrovalves 30a, 30b, 34a, 34b and 46 are all closed.

The heating means integrated in trays 18a and 18b and with heating zones 36a, 36b, 38 and 40 are then actuated, in particularly to locally melt the resin adjacent to the heating trays in each of reservoirs 16a, 16b.

When the desired temperature is reached, the resin injection circuits substantiated by pipes 26a and 26b are purged. For this purpose, electrovalves 34a and 34b are opened and pumps 20a and 20b are placed in operation. The air contained in the circuits and between trays 18a, 18b and the free surface of the resin is therefore evacuated and replaced by resin.

At the same time vacuum pump 44 is actuated and electrovalve 46 is opened to set up a vacuum inside mould 10 and inside that part of the injection circuit located downstream from electrovalves 30a and 30b. Vacuum circuit 42 is maintained in this state until the end of injection.

When draining of the resin injection circuits is completed, drain electrovalves 34a, 34b are closed and injection of the resin into the mould can begin.

Injection begins from one of the reservoirs such as the first reservoir 16a in the single FIGURE. It is triggered by opening corresponding injection electro-valve 30a. As and when the melted resin on the free surface of reservoir 16a is injected into the mould, under the combined action of pump 20a and vacuum pump 44, tray 18a moves downwards in reservoir 16a under gravity and under the effect of forces. The under surface of the heating tray therefore remains in contact with the free surface of the resin which therefore melts gradually over a thickness enabling its pumping, with no risk of exothermal reaction.

The volume of resin injected into the mould is controlled, for example by measuring the number of revolutions of pump 20a, if a rotary pump is used. Since the volume of resin contained in reservoir 16a is known, the moment when it is almost empty can be detected, that is the time when resin injection must be switched from first reservoir 16a to second reservoir 16b.

When "almost empty" status is detected of first reservoir 16a, the central command unit 48 closes injection electrovalve 30a and simultaneously opens injection electrovalve 30b. Also, the operator is immediately informed thereof by sound and/or visual display means.

Injection of resin into mould 10 therefore continues without interruption from second reservoir 16b. The process of resin injection from second reservoir 16b is the same as previously described for first reservoir 16a. No detailed description thereof is therefore necessary.

At the same time, the operator informed of the "almost empty" status of the first reservoir replaces the latter by a full reservoir after removing heating tray 18a with its pump 20a. It is to be noted that the operator has largely sufficient time to carry out this operation since the injection time for approximately 10 kilograms of resin contained in each reservoir for example is approximately 13 minutes for an average flow rate of around 700 grams per minute.

When the operator has changed reservoir 16a, the heating tray 18a carrying pump 20a is replaced in position. The heating means of tray 18a are then replaced in operation and a further drain of the corresponding injection circuit is made by actuating pump 20a and opening electrovalve 30a. When these operations are completed, injection of resin from the first reservoir 16a again becomes possible.

Consequently, as soon as "almost empty" status of the second reservoir 16b is detected, for example through counting the number of revolutions of motor 22b of pump 20b, resin injection is switched from second reservoir 16b to first reservoir 16a. This is achieved by closing electrovalve 30b and simultaneously opening electrovalve 30a controlled by central command unit 48.

As previously, the central command unit warns the operator of the "almost empty" status of second reservoir 16b. The operator must therefore replace this reservoir by one filled with resin. This operation is conducted in the same manner as described previously for first reservoir 16a, i.e. by dismounting tray 18b, replacing reservoir 16b, replacing tray 18b in position and draining the corresponding circuit.

The operations just described are renewed as many times as necessary until complete filling of cavity 12 of mould 10 with resin. They allow production of a large-size item without interrupting resin injection and with the use of only two reservoirs 16a, 16b at the same time, which are alternately connected to mould 10, and by replacing one of the reservoirs while the other is used for injection.

The resin injection method of the invention can be used to produce items of varying size, with no size limitations other than those imposed by resin viscosity, using an installation of reduced size that is particularly easy to place in operation. Also localised heating of the resin in the reservoirs eliminates risks of exothermal reaction which could arise from mass heating of the resin.

The invention claimed is:

1. Method for injecting resin into a mould containing a fibrous preform, in which the same resin is injected into the mould alternately from a first reservoir and from a second reservoir so that they are emptied in turn, and the first reservoir filled with resin is placed in position while injecting resin from the second reservoir and conversely, for continuous injection into the mould of a quantity of resin greater than the accumulated capacity of said first reservoir and second reservoir in which the resin is alternately injected from the first reservoir and from the second reservoir by heating the free surface of the resin contained in said reservoirs to cause melting in the immediate vicinity of said free surface of said resin, then by pumping the locally melted resin towards the mould.

2. Method according to claim 1 in which, in each of the first and second reservoirs the free surface of the resin is heated by means of a heating tray resting under gravity on said free surface.

3. Method according to claim 2 in which, in each of the first and second reservoirs, the locally melted resin is pumped by means of a pump integral with the heating tray.

4. Method according to claim 1 in which, prior to injecting the resin into the mould, the circuits connecting the first reservoir and second reservoir to said mould are drained.

5. Method according to claim 1, in which degassed resin is used.

6. Method according to claim 1, in which the resin is degassed between the first and second reservoirs, and the mould.

* * * * *